United States Patent [19]
Holo et al.

[11] Patent Number: 5,852,615
[45] Date of Patent: *Dec. 22, 1998

[54] METHOD AND SYSTEM FOR TRANSMITTING DATA FROM A UNIDIRECTIONAL TRANSMITTER TO A RECEIVER

[75] Inventors: David L. Holo, Kent; Alfred L. Schumer, Redmond, both of Wash.; John Morrow, Fremont, Nebr.

[73] Assignee: Microsoft Corp., Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 764,237

[22] Filed: Dec. 14, 1996

[51] Int. Cl.$^6$ ............................. G01R 31/28; G06F 15/16
[52] U.S. Cl. ........................................... 371/20.1; 364/550
[58] Field of Search ............................ 371/20.1, 20.4, 371/21.6, 20.2, 5.4; 364/514, 515, 551.01, 486, 550, 580; 324/753, 751; 345/1, 2, 169, 156; 395/881, 183.19

[56] References Cited

U.S. PATENT DOCUMENTS

| | | | |
|---|---|---|---|
| 5,455,570 | 10/1995 | Cook et al. | 340/825.22 |
| 5,488,571 | 1/1996 | Jacobs et al. | 364/705.07 |
| 5,490,209 | 2/1996 | Kennedy et al. | 379/97 |
| 5,535,147 | 7/1996 | Jacobs et al. | 364/705.07 |
| 5,570,297 | 10/1996 | Brzezinski et al. | 364/514 R |
| 5,594,462 | 1/1997 | Fisherman et al. | 345/2 |
| 5,619,191 | 4/1997 | Lambropoulos et al. | 340/825.69 |
| 5,629,868 | 5/1997 | Tessier et al. | 364/514 R |
| 5,650,774 | 7/1997 | Drori | 340/825.32 |
| 5,652,602 | 7/1997 | Fisherman et al. | 345/156 |
| 5,657,078 | 8/1997 | Saito et al. | 348/180 |

OTHER PUBLICATIONS

U.S. Patent Application Serial No. 08/394,659 entitled "System and Method for Remotely Managing Memory In A Portable Information Device From An External Computer," inventors Vinay Deo and Neil s. Fishman, filed Feb. 2, 1995.

U.S. Patent Application Serial No. 08/428,917 entitled "System and Method for Remotely Programming A Portable Information Device Using Optical Serial Data Transmission From A Frame–Scanning Graphics Display Device," inventors Victor Shiff, Neil S. Fishman, and Philip Brzezinski, filed Apr. 25, 1995.

*Primary Examiner*—Robert W. Beausoliel, Jr.
*Assistant Examiner*—Nadeem Iqbal
*Attorney, Agent, or Firm*—Jones & Askew, LLP

[57] ABSTRACT

A method and apparatus for programming a device, such as a universal remote control unit, using a light source, such as a CRT computer monitor coupled to a conventional personal computer. A unidirectional flow of data from the transmitter is used to configure to the receiver. Specifically, a method is provided for synchronizing the baud rates and bytes-per-frame of the receiver and the transmitter. The receiver baud rate is selected based on a "55 hex" synchronization signal received from the transmitter. The receiver measures a synchronization parameter to determine the exact baud rate of the transmitter, to which the receiver synchronizes. Thus, transmitter-to-transmitter baud rate differences, such as those caused by design differences and manufacturing tolerances, do not limit the rate at which data may be transmitted from a particular transmitter to a particular receiver. A method is also provided for verifying the integrity of data received at the receiver. Data is transmitted in segments, and an integrity check parameter is included in each segment. The integrity check parameter includes a "check-sum" parameter that denotes the number of bytes of data in the segment and/or a packet number that indicates the number of the packet in a sequence of data packets defining a data segment. The receiver compares the number of bytes received in the segment to the number of bytes denoted by the integrity check parameter. If the number of bytes segment does not match the number of bytes denoted by the integrity check parameter, the receiver indicates an error condition.

25 Claims, 5 Drawing Sheets

METHOD AND SYSTEM FOR TRANSMITTING DATA FROM A UNIDIRECTIONAL TRANSMITTER TO A RECEIVER

TECHNICAL FIELD

The present invention relates to unidirectional transmitter and receiver systems. Specifically, the present invention relates to a method and system for using a light source, such as cathode-ray tube, to program a photo-sensitive receiver, such as a remote control unit.

BACKGROUND OF THE INVENTION

Many household items come with remote control units. In fact, so many items come with remote control units that just keeping track of all the remote control units can present a problem. Consider a home entertainment center including a television, a VCR, a cable box, a CD player, a stereo receiver, a cassette player, a satellite controller, and a laser-disc player. If each device can be controlled with a separate remote control unit, the user has to fumble with eight remote control units. Most people find this to be far too many remote control units to easily manage for convenient control of these devices.

The coffee table can be cleared of these remote control units thanks to the advent of the universal remote control unit. A universal remote control unit can be configured to communicate with a wide range of devices and thus replace a multiplicity of standard remote control units. Configuring one of these universal remote control units, however, can be a tedious task. Typically, the user has to look up a code in an instruction manual for each device to be controlled by the universal remote control unit. A special sequence of commands, also looked up in the manual, allows the universal remote control unit to be configured to control each device. Many universal remote control units, however, do not provide the user with feedback during the configuration process. A single mistake may require that the entire configuration process be repeated. Configuring the universal remote control unit can therefore be a time consuming and exasperating procedure.

The instruction manual for the universal remote control unit, of course, should be kept in a safe place. But everyone is not as careful as they should be, and some people misplace their manuals. Months, even years, may go by before the manual is missed. But sooner or later, a new device may be purchased for the entertainment center, and the universal remote control unit must be configured to control the new device. The unlucky owner who has misplaced the manual may spend hours searching in vain. Days or weeks may pass before a replacement instruction manual can be located. There is, therefore, a need for a better method and system for configuring a universal remote control unit.

Systems have been developed for using a computer monitor including a cathode-ray tube (CRT) for transmitting information to a photo-sensitive receiver. For example, the "DATALINK" system manufactured by Timex Corporation of Middlebury, Conn. uses a CRT as a unidirectional transmitter for configuring a personal information manager that is carried within a wristwatch. To receive information displayed on the CRT, the receiver in the wristwatch includes a photo-detector that fires electronic pulses in response to light pulses. Holding the receiver in front of the CRT so that the CRT is within the photo-detector's cone of reception allows the photo-detector to fire electronic pulses in response to light pulses displayed on the CRT.

A CRT display is built around a vacuum tube containing one or more electron guns whose electron beams rapidly sweep horizontally across the inside of the front surface of the tube, which is coated with a phosphor material that glows when irradiated. The image created by a conventional CRT is actually composed of a matrix of pixels (dots), typically 640 horizontal pixels by 480 vertical pixels. The electron beam moves from left to right, top to bottom, irradiating the phosphors to illuminate the pixels one at a time, one horizontal scan line after another. The electron gun sweeps an entire screen, or frame, at a designed "vertical refresh rate." Conventional CRTs included in computer monitors operate at a wide variety of vertical refresh rates, such as 60 Hertz (frames per second), 70 Hertz, 75 Hertz, etc.

Properly receiving light pulses displayed on a CRT as data requires that the baud (bit-per-second) rate of the receiver be synchronized with the rate at which the CRT displays light pulses. In other words, the receiver must "know" how often a pulse is displayed on the CRT so that each pulse, or lack of a pulse, may be interpreted as a data bit.

One drawback of the "DATALINK" system is that it uses receivers with a single, fixed baud rate to receive data transmitted from all types of computer monitors. As each receiver must be able to receive data from all types of monitors, the fixed baud rate of the receivers must be set to the rate at which the slowest monitor may be operated as a transmitter.

Furthermore, the actual baud rates of fixed-baud-rate receivers, such as those using the "DATALINK" technology, are actually variable with a small expected deviation due to manufacturing tolerances. Similarly, CRTs operated as transmitters also have slightly variable baud rates due to manufacturing tolerances in horizontal scan and vertical refresh rates. Allowing a host program module to adjust for these manufacturing tolerances requires that several buffer scan lines be placed between scan lines that represent data bits.

In the "DATALINK" system, an illuminated scan line defines the leading edge of a "zero" data bit. Only certain scan lines, however, signify data bits because there are a number of buffer scan lines between scan lines that signify data bits. Thus, an illuminated horizontal scan line at a data bit position defines the leading edge of a "zero" data bit. Similarly, a non-illuminated horizontal scan line at a data bit position defines the leading edge of a "one" data bit. Buffer scan lines are required because the fixed baud rate of the "DATALINK" system is very slow compared to the scan rate of the CRT. Also, serial communications require a bit accuracy of plus or minus five percent. Thus, it requires 20 buffer scan lines between scan lines that signify data bits to allow one scan line to impart a five percent adjustment.

For example, the "DATALINK" technology includes about 20 to 40 blank scan lines between scan lines that represent data bits. The "DATALINK" technology is therefore limited to transmitting about 12 to 24 bits per 480 line CRT frame. As the standard RS-232 protocol uses 10 bits to represent a byte of data (i.e., a start bit, eight data bits, and a stop bit), the "DATALINK" technology includes a design standard of transmitting one or two bytes of RS-232 formatted data per frame.

As a result, a typical 60 Hertz CRT is limited to transmitting data at 1200 baud using the "DATALINK" technology. This data transmission rate is inadequate for certain applications, such as programming a universal remote control unit. For example, configuring a typical universal remote control unit requires about 10 to 12 thousand bytes of data. At 1200 baud, configuring the universal remote control unit would require over a minute, which is too long to ask a user to hold the universal remote control unit in front of the CRT.

Moreover, the maximum possible baud rates of both the CRT transmitter and the receiver are much higher than the actual baud rate realized with the "DATALINK" technology. In addition, the "DATALINK" technology does not operate at its maximum data throughput rate. There is, however, no mechanism within the "DATALINK" technology for the transmitter and the receiver to "handshake" to establish a maximum data throughput rate because the data flow is unidirectional from the transmitter to the receiver. There is, therefore, a need for an improved method and system for using a CRT as a unidirectional transmitter.

In summary, there is a need for an improved system for configuring a device such as a universal remote control unit. The system should have the advantages of requiring only inexpensive alterations to a conventional universal remote control unit, and being easy to implement using a conventional personal computer. For example, these advantages could be attained by providing a universal remote control unit with a photo-sensitive receiver that can be programmed by a CRT controlled by a conventional personal computer. Prior art systems that use CRTs as unidirectional transmitters, however, cannot download a sufficient amount of data in a sufficiently short period of time.

SUMMARY OF THE INVENTION

The present invention provides a universal remote control unit that may be configured using a conventional cathode-ray tube (CRT), such as a television or computer monitor. More specifically, a CRT controlled by a conventional personal computer may be used as a unidirectional transmitter for configuring the universal remote control unit. The CRT is operated as a unidirectional transmitter by using each scan line to represent a data bit. A typical CRT including 480 scan lines may therefore be operated to transmit 480 bits, or 48 RS-232 formatted bytes, of data per frame For a typical 60 Hertz CRT, this translates to 28,800 baud. The 10 to 12 thousand bytes required to configure a typical universal remote control unit can therefore be downloaded in about four seconds.

Although the present invention is described herein in the context of a universal remote control unit configured by CRT, it should be appreciated that the present invention may be applied to any unidirectional transmitter and receiver system. Generally described, the present invention provides a method for communicating data between a unidirectional transmitter and a receiver. At the transmitter, a maximum baud rate for the transmitter is determined, and a baud rate for the transmitter is selected equal to about the lesser of the maximum baud rate for a known receiver and the maximum baud rate for the transmitter. A synchronization signal is then transmitted at the selected baud rate for the transmitter. At the receiver, the synchronization signal is received, a synchronization parameter is measured from the synchronization signal, and a baud rate for the receiver is selected based on the synchronization parameter. The receiver may indicate that it is in a "locked" (baud rate selected) condition upon selecting the baud rate for the receiver.

Once the receiver is synchronized with the transmitter, a data segment is transmitted at the selected baud rate for the transmitter. The data segment may include any data other than the synchronization signal, such as application data that configures the receiver to perform a desired function. The data segment is received at the selected baud rate for the receiver, and stored in a memory storage device of the receiver. An integrity check parameter may then be transmitted, and the receiver determines whether the data segment was properly received based on the integrity check parameter. If the data segment was not properly received, the receiver may indicate an "error" (time-out or integrity check failed) condition.

According to an aspect of the present invention, the transmitter includes a CRT for displaying information, and the receiver includes a photo-detector. The synchronization signal includes a number of bits, the CRT is operative to display consecutive horizontal scan lines, and each of the consecutive horizontal scan lines includes a bit of the synchronization signal. For example, the synchronization signal may include alternating illuminated and non-illuminated scan lines displayed on the CRT.

According to another aspect of the present invention, the data segment includes a sequence of packets and the integrity check parameter includes a data element that indicates a packet number that corresponds to the number of the packet containing the integrity check parameter in the sequence of packets. In an embodiment, the sequence of packets is defined by a sequence of screen displays on a CRT. In this embodiment, the packet number may correspond to the number of the screen display containing the integrity check parameter within the sequence of screen display on the CRT.

According to another aspect of the present invention, the integrity check parameter may denote an amount of data included in the transmitted data segment. The receiver determines an amount of data included in the received data segment, and compares the amount of data included in the received data segment to the amount of data denoted by the integrity check parameter.

According to another aspect of the present invention, the transmitter includes a CRT for displaying information, and the receiver includes a universal remote control unit for controlling an appliance. Application data displayed on the CRT configures the universal remote control unit to interact with the appliance. The application data is displayed in segments. Each segment includes a number of bits wherein each of the consecutive horizontal scan lines displayed on the CRT defines the leading edge of a bit of the segment of application data.

In view of the foregoing, it will be appreciated that the present invention provides a universal remote control unit that may be configured using a CRT that is controlled by a conventional computer system to operate as a one-scanline-per-bit unidirectional transmitter. The universal remote control unit includes a photo-sensitive receiver with an adjustable baud rate that automatically synchronizes to the baud rate of a CRT. Specifically, the baud rate of the receiver synchronizes to the baud rate of the transmitter in response to a synchronization signal from the transmitter. The universal remote control unit measures a synchronization parameter from the synchronization signal to determine the baud rate of the transmitter, and then synchronizes with the transmitter. Once synchronized, the universal remote control unit typically indicates that it is in a locked condition, for example by displaying a message or illuminating a lock indicator light on the unit. The universal remote control unit is then ready to receive a data segment, such as a segment of application data.

This application data configures the universal remote control unit to interact with one or more remotely controlled appliances. The application data is typically transmitted by the CRT in segments. A frame makes for a convenient segment, although segments of other sizes may be used. The universal remote control unit may not receive a data segment properly, however, if the unit is pointed in the wrong direction or held too far away from, or too close to, the CRT. An integrity check parameter may therefore be transmitted from the CRT to the universal remote control unit. This integrity check parameter allows the universal remote control unit to determine whether it correctly received the transmitted data, segment.

Typically, the integrity check parameter is the last byte of each data segment. For example, the integrity check parameter may be a "check-sum" parameter that denotes the number of bytes in the data segment. The universal remote control unit counts the number of bytes in the received data segment and compares the number of bytes in the data segment to the number of bytes denoted by the integrity check parameter. If the number of bytes in the received data segment does not match number of bytes denoted by the integrity check parameter, the universal remote control unit typically indicates an error condition, for example, by displaying a message or illuminating an error indicator light on the unit.

DETAILED DESCRIPTION

A disclosed embodiment of the present invention provides a method and apparatus for programming a device, such as a universal remote control unit, using a light source, such as a CRT computer monitor coupled to a conventional personal computer. A unidirectional flow of data from the transmitter is used to configure to the receiver. Specifically, a method is provided for synchronizing the baud rates and bytes-per-frame of the receiver and the transmitter.

The receiver baud rate is selected based on a "55 hex" synchronization signal received from the transmitter. The receiver measures a synchronization parameter to determine the exact baud rate of the transmitter, to which the receiver synchronizes. Thus, transmitter-to-transmitter baud rate differences, such as those caused by design differences and manufacturing tolerances, do not limit the rate at which data may be transmitted from a particular transmitter to a particular receiver.

A method is also provided for verifying the integrity of received data. Data is transmitted in segments, and an integrity check parameter is included in each data segment. The integrity check parameter may include a "check-sum" parameter that denotes the number of bytes of data in the segment. The receiver compares the number of bytes in the received data segment to the number of bytes denoted by the integrity check parameter. If the number of bytes in the segment does not match the number of bytes denoted by the integrity check parameter, the receiver indicates an error condition. The integrity check parameter may also include a packet number that indicated the number of the packet containing the integrity check parameter in a sequence of packets defining a data sequence.

The following detailed description is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, a method or process is generally conceived to be a sequence of computer-executed steps leading to a desired result. These machine-implemented steps, which can be maintained as in the form of a program module, generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms are associated with appropriate physical quantities for computer operations, and that these terms are merely conventional labels applied to these physical quantities that exist within the computer.

In addition, it should be understood that the programs, processes, methods, etc., described herein are not related or limited to any particular computer, single chip processor, or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The Operating Environment

Figure 1:
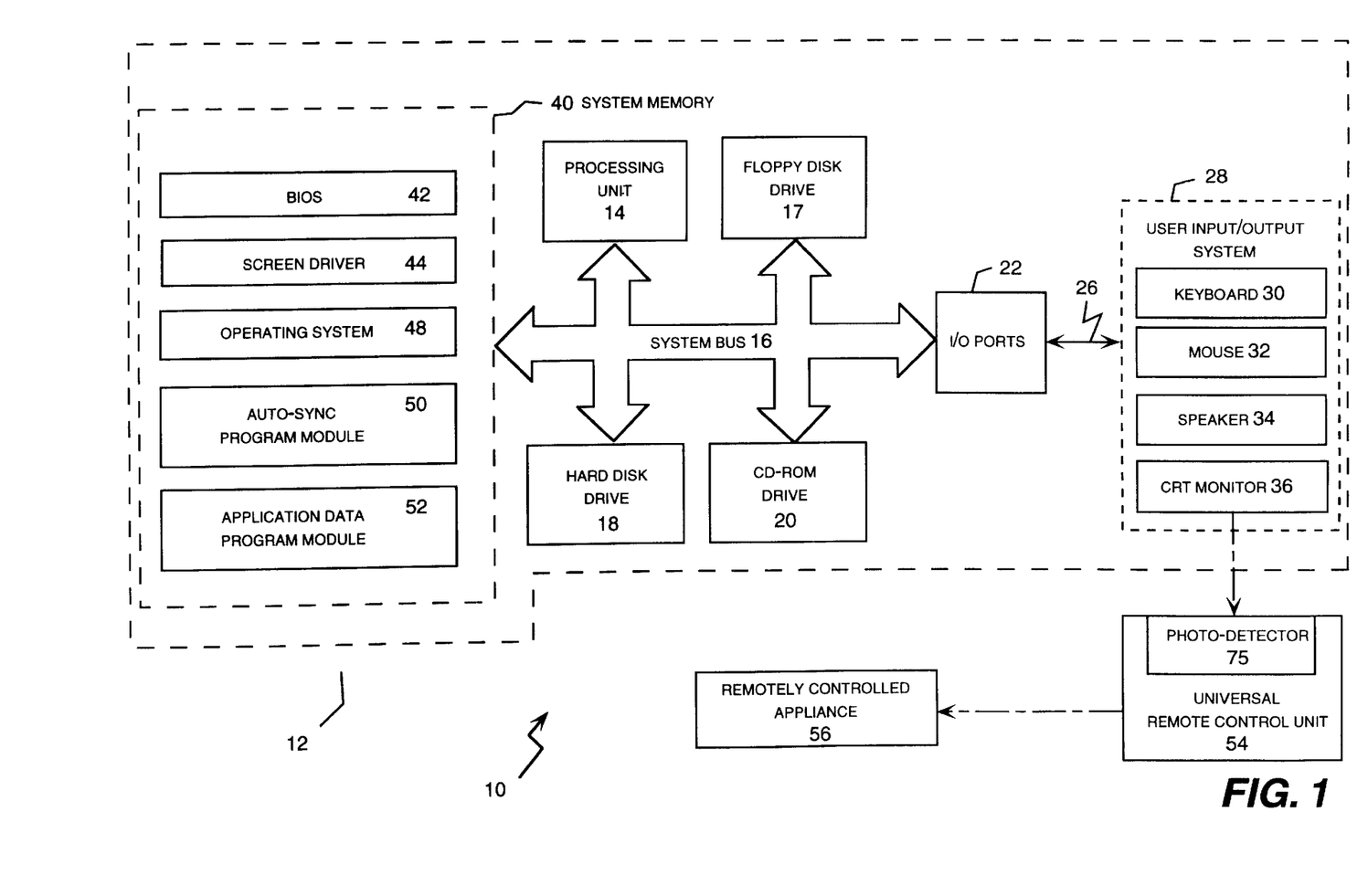
FIG. 1 is a functional block diagram of unidirectional transmitter and receiver system including a conventional personal computer system that provides the operating environment for a disclosed embodiment of the present invention.

FIG. 1 is a functional block diagram of a unidirectional transmitter and receiver system 10 including a conventional personal computer system 12 that provides the operating environment for a disclosed embodiment of the present invention. The computer system 12 may be any of a variety of personal computers such as "APPLE," "IBM," or "IBM"-compatible personal computers. The computer system 12 includes a processing unit 14 connected by way of a system bus 16 with I/O devices including a floppy disk drive 17, hard disk drive 18, and a CD-ROM drive 20. The system bus 16 also connects the processing unit 14 with I/O ports 22 that are used to connect the computer system 12 with a plurality of external I/O devices. In particular, the I/O ports 22 are connected by way of a cable connector 26 with a user input/output system 28 including a keyboard 30, mouse 32, speaker 34, and monitor 36. For the present invention, the monitor 36 preferably includes a cathode-ray tube (CRT).

The processing unit 14 is also connected by way of the system bus 16 to a system memory 40, typically a Read Only Memory (ROM) resource and a random access memory (RAM) resource, typically of at least about eight megabytes. The processing unit 14 communicates by means of control, address, and data signals with the software resident within system memory 40, including a screen driver 44 and an operating system 48. The preferred embodiment of the present invention operates in conjunction with a variety operating systems, including "WINDOWS NT" and "WINDOWS 95" manufactured by Microsoft Corporation, Redmond, Wash., assignee of the present invention.

The computer system 12 has a distinct hierarchy of software retained in the system memory 40 that controls the operation of the system at all times. Communications generally occur only between adjacent levels in the hierarchy, although there are some exceptions. The hardware, primarily the processing unit 14 and system memory 40, is at the lowest level in the hierarchy. External I/O devices such as the user input/output system 28 are controlled by the basic input-output system (BIOS) 42, which is at the next level in the hierarchy. The BIOS 42 writes or reads bytes of data to or from memory address ports. A memory address port is a predefined location within the system memory 40 that is dedicated to communicating with an external device such as the monitor 36, a printer, a modem, or the like.

The BIOS 42 is usually located on a ROM and is specific to the computer that it supports. The BIOS 42 operates as an interface between the processing unit 14 and the operating system 48 by receiving instructions from the operating system and translating the instructions into manipulation of the memory address ports. The BIOS 42 provides a uniform interface between the computer's operating system software and the specific hardware configuration of a particular computer, primarily the processing unit 14 and the system memory 40, allowing standardization of operating system instructions used to control the hardware of different computers.

Device drivers that support external I/O devices operate at the next level in the hierarchy. For example, the screen driver 44 is specifically configured to communicate with the monitor 36. The screen driver 44 responds to the presence of data placed in a predefined memory address port by the BIOS 42. Specifically, the screen driver 44 transmits data from the predefined memory address to the monitor 36 in the particular protocol required by the monitor 36 so that the data is displayed properly on the screen. Other device drivers similarly support other I/O devices: a floppy disk driver supports the floppy disk drive 17, a hard disk driver supports the hard disk drive 18, a CD-ROM driver supports the CD-ROM drive 20, etc.

A standardized operating system 48, preferably "WINDOWS NT" or "WINDOWS 95," operates the next level in the hierarchy. The operating system 48 is usually installed in a mass-storage computer memory, such as the hard disk drive 18 or a CD-ROM within the CD-ROM drive 20. During boot-up (initialization) of the computer system 12, the operating system 48 and the device drivers, such as the screen driver 44, are loaded into the system memory 40, usually from the hard disk drive 18. The operating system 48 provides the interface between the processing unit 14 and other higher level modules, such as task-specific program modules. Generally, higher level task-specific program modules issue instructions, whereas the operating system 48 controls the operation of the processing unit 14 so that these instructions are processed in an orderly manner.

Task-specific program modules operate at the next level in the hierarchy to perform specialized functions. Common task-specific program modules include word processors, spread sheets, databases, games, etc. During operation, one or more task-specific program modules are loaded into system memory 40, usually from the hard disk drive 18, the CD-ROM drive 20, or other memory storage devices. For example, the computer system 12 preferably includes an auto-sync program module 50 and an application data program module 52 within the system memory 40. The application data program module 52 may contain any type data other than the synchronization signal. For example, in the disclosed embodiment, the application data program module 52 contains data that configures the universal remote control unit 54 to interact with remotely controlled appliances, represented by the remotely controlled appliance 56.

The operating system 48 provides a variety of functions, services, and interfaces that allow the task-specific program modules to easily deal with various types of I/O. This allows the task-specific program modules to issue relatively simple function calls that cause the operating system 48 to perform the steps required to accomplish various tasks, such as displaying information on the monitor 36. In response, the operating system 48 sends I/O instructions to the BIOS 42, which implements the instructions by writing data to or reading data from a memory address port. The screen driver 44 then transport the data from the memory address port to the monitor 36 to create a screen display.

Physical Structures of the Disclosed Embodiments

Still referring to FIG. 1, a disclosed embodiment of the present invention provides a unidirectional transmitter and receiver system 10 for programming a device, such as the universal remote control unit 54, using a light source, such the computer monitor 36 coupled to the computer system 12. An important aspect of the invention is the ability to use a unidirectional flow of data from the transmitter, i.e., the monitor 36, to the receiver, in this case the universal remote control 54, to configure the receiver. More specifically, the disclosed embodiment provides a method for synchronizing the baud rates and bytes-per-frame of the receiver and the transmitter. The disclosed embodiment further provides a method for verifying the integrity of transmissions from the transmitter to the receiver.

The disclosed embodiment improves over the previously-discussed "DATALINK" technology by allowing the receiver to automatically synchronize to the baud rate of the transmitter. The baud rate for the receiver is selected based on a synchronization signal received from the transmitter. The synchronization signal includes a synchronization parameter that the receiver measures to determine the exact baud rate of the transmitter, to which the receiver synchronizes. Thus, transmitter-to-transmitter baud rate differences, such as those caused by design differences and manufacturing tolerances, do not limit the rate at which data may be transmitted from a particular transmitter to a particular receiver.

The computer system 12 includes an auto-sync program module 50 that causes the synchronization signal to be displayed by the monitor 36, typically in response to a synchronization command received from the user input/output system 28. The synchronization signal is received by the photo-detector 75 of the universal remote control unit 54, which measures a synchronization parameter from the synchronization signal. The universal remote control unit 54 selects its baud rate based on the synchronization parameter, and indicates that it is in a locked condition, for example by displaying a message or illuminating a light on the unit.

After selecting a baud rate, the universal remote control 54 unit is ready to receive application data. The computer system 12 includes an application data program module 52 that causes application data to be displayed on the monitor 36, typically in response to a data download command received from the user input/output system 28. The application data is preferably transmitted in segments wherein each frame displayed on the monitor 36 includes a segment of application data. Each horizontal scan line of a frame preferably defines the leading edge of an individual data bit. For example, an illuminated horizontal scan line defines the leading edge of a binary zero and a non-illuminated horizontal scan line defines the leading edge of a binary one.

The application data configures the universal remote control unit 54 to control one or more appliances represented by the remotely controlled appliance 56. The universal remote control unit 54 may thus be configured to communicate with a wide range of devices so as to replace a multiplicity of standard remote control units. The remotely controlled appliances may be several similar devices, such as several televisions, or several dissimilar devices, such as a television, a VCR, a cable box, a CD player, a stereo receiver, a cassette player, a satellite controller, a laser-disc player, etc. In addition, other household items such as lights, coffee pots, sprinkler systems, thermostats, and the like may be controlled by the universal remote control unit 54. It will be appreciated that the application data typically configures the universal remote control unit 54 to communicate with a particular appliance 56 by identifying a communication protocol, as is well known to those skilled in the art.

It will be further appreciated that the application data may include operating instructions that are transmitted from the computer system 12 to the appliance 56 by way of the universal remote control unit 54. For example, a VCR may be instructed to record at a particular time on a particular television station, a coffee pot may be instructed to begin percolating at a particular time, a thermostat may be instructed to adjust its temperature setting at a particular time, etc. This aspect of the present invention allows the computer system 12 to function as a centralized, user-friendly platform for programming a wide variety of household items.

Figure 2A:
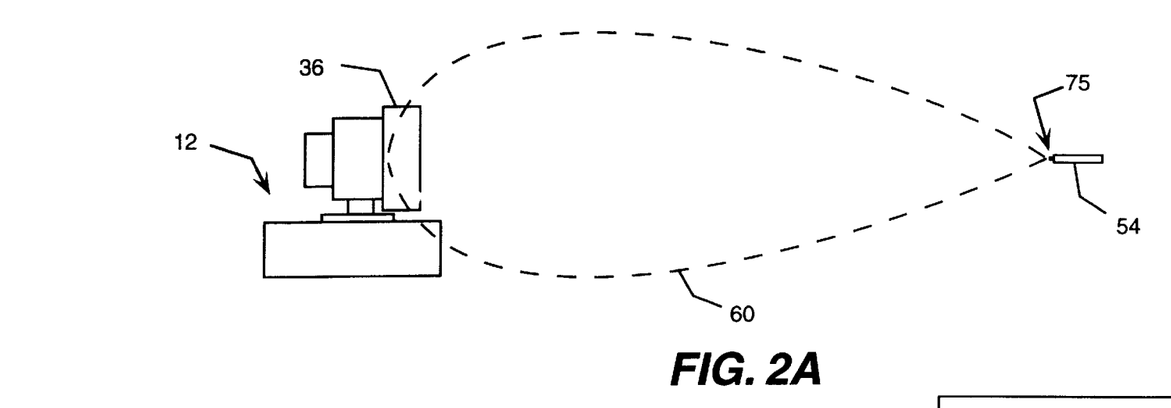
FIG. 2A is a diagram that illustrates a cone of reception for a photo-detector.

FIG. 2A is a diagram that illustrates a cone of reception 60 within which the photo-detector 75 is responsive to light pulses displayed by the monitor 36. It should be understood that the universal remote control unit 54 must be positioned so that substantially all of the CRT screen of the monitor 36 is within the cone of reception 60. If the universal remote control unit 54 is positioned too far away from the monitor 36, the photo-detector 75 of the universal remote control unit 54 will not fire in response to light pulses displayed on the monitor 36. If, on the other hand, the remote control unit 54 is positioned too close to the monitor 36, the photo-detector 75 of the universal remote control unit 54 will not fire in response to light pulses displayed on the extreme top and bottom portions of the monitor 36.

The photo-detector 75 of the universal remote control unit 54 should therefore be selected to provide an appropriate cone of reception 60 for use in a typical universal remote control unit. Any of a variety of commercially available wide-reception-angle phototransistors may be used. The phototransistor must have a cone of reception and sensitivity that allows the phototransistor to receive data from the entire monitor 36 when held at a reasonable distance from the CRT. For example, phototransistor PT-370 manufactured by Sharp Electronics provides a photo-detector 75 with an appropriate cone of reception and sensitivity.

Figure 2B:
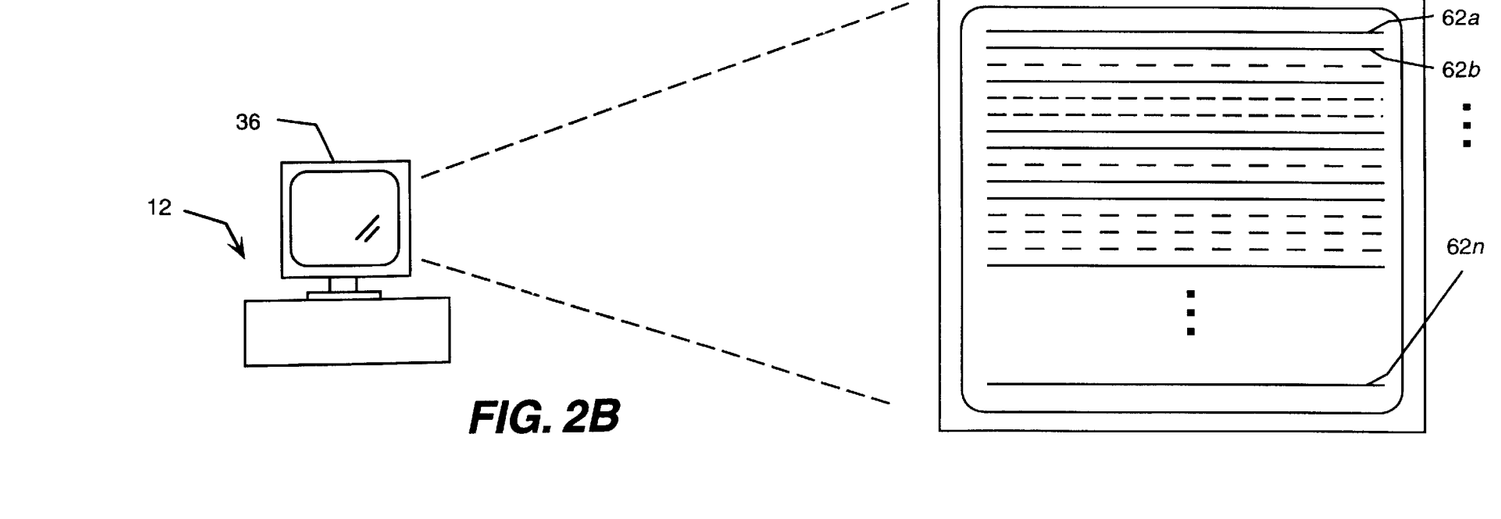
FIG. 2B is a diagram that illustrates a CRT operating as a unidirectional transmitter.

FIG. 2B illustrates the preferred operation of the monitor 36 as a unidirectional transmitter. For the disclosed embodiment of the present invention, the auto-sync program module 50 and the application data program module 52 each include instructions which, when executed by the computer system 12, cause the monitor 36 to operate as a one-bit-per-scan-line unidirectional transmitter. Specifically, each scan line, represented by the scan lines 62a through 62n, defines the leading edge of an individual data bit. An illuminated scan line, represented by the solid scan line 62a, defines the leading edge of a binary zero. A non-illuminated scan line, represented by the dashed scan line 62b, defines the leading edge of a binary one. Advantageously, each horizontal scan line displayed on the monitor 36 signifies an individual data bit, thus allowing a typical CRT having 480 scan lines to transmit 480 bits per frame.

Figure 3:
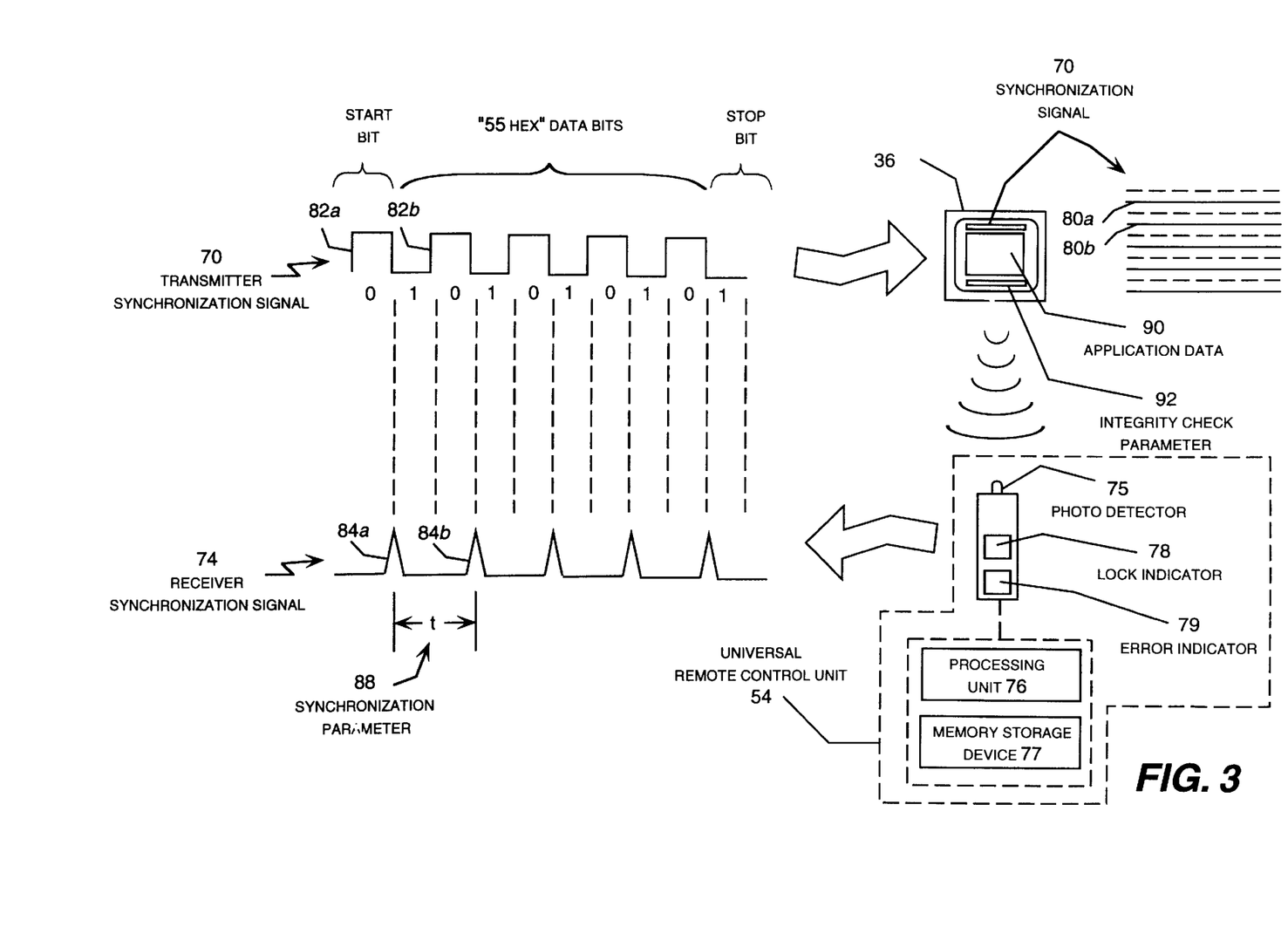
FIG. 3 is a diagram illustrating a synchronization signal transmitted by a CRT operating as a unidirectional transmitter.

FIG. 3 is a diagram illustrating a transmitter synchronization signal 70 displayed by the monitor 36, which is operating as a unidirectional transmitter. The transmitter synchronization signal 70 is received by the universal remote control unit 54, which includes a photo-detector 75, a processing unit 76, a memory storage device 77, a lock indicator 78, and an error indicator 79. The transmitter synchronization signal 70 causes the photo-detector 75 of the universal remote control unit 54 to create a receiver synchronization signal 74.

Specifically, the transmitter synchronization signal 70 is an alternating pattern of ones and zeros which, due to the RS-232 start/stop protocol, is equivalent to "55 hex." Ones are displayed on the monitor 36 as non-illuminated scan lines, which are illustrated as dashed lines in FIG. 3. Zeros are displayed on the monitor 36 as illuminated scan lines, which are illustrated as solid lines in FIG. 3. The "55 hex" transmitter synchronization signal 70 therefore appears on the monitor 36 as an alternating sequence of illuminated and non-illuminated scan lines, represented by the scan lines 80a and 80b. Each illuminated scan line of the transmitter synchronization signal 70 includes a leading edge, represented by the leading edges 82a and 82b. The photo-detector 75 receives the dark-to-light transitions of these leading edges as light pulses. In response, the photo-detector 75 fires electronic pulses, represented by the electronic pulses 84a and 84b, thus generating the receiver synchronization signal 74.

The universal remote control unit 54 measures a synchronization parameter 88, which is the time "t" between electronic pulses, represented by the electronic pulses 84a and 84b. The synchronization parameter 88 represents the time required for the transmission of two data bits by the monitor 36. The baud rate of the monitor 36, which is operated as a unidirectional transmitter, is therefore derived as "2/t." The baud rate of the universal remote control unit 54 is selected to be about equal to this derived baud rate, preferably within plus or minus five percent, which is the tolerance required to by the RS-232 communication protocol. Once the baud rate of the universal remote control unit 54 is selected, the universal remote control unit 54 preferably indicates that it is in a locked condition by illuminating the lock indicator 78 on the universal remote control unit 54. The universal remote control unit 54 is then ready to receive application data 90.

The transmitter synchronization signal 70 is typically followed by a segment of application data 90, which may be followed by an integrity check parameter 92. It should be understood that the transmitter synchronization signal 70 is preferably displayed only long enough for the universal remote control unit 54 to synchronize to the baud rate of the monitor 36. A single frame, or a portion of a frame, is usually sufficient for the universal remote control unit 54 to synchronize to the baud rate of the monitor 36. Subsequent frames therefore include only a segment of application data 90, which may be followed by an integrity check parameter 92. Optionally, the application data program module 52 waits for a data download command from the user input/output system 28 prior to beginning transmission of the application data 90.

The application data 90 is preferably transmitted by the monitor 36 in segments, one segment per frame. The universal remote control unit 54 may not receive a segment properly, however, if the unit is pointed in the wrong direction or held too far away discussed previous to, the monitor 36, as discussed previously. An integrity check parameter 92 may therefore be transmitted from the monitor 36 to the universal remote control unit 54. The integrity check parameter 92 allows the universal remote control unit 54 to determine whether it has correctly received the transmitted segment.

Each segment of application data 90 may include an integrity check parameter 92, typically in the last byte of the data segment. The integrity check parameter 92 allows the universal remote control unit 54 to determine whether it has correctly received the data segment. For example, the integrity check parameter may include a "check-sum" parameter that denotes the number of bytes in the data segment. The universal remote control unit 54 compares the number of bytes in the received data segment to the number of bytes denoted by the integrity check parameter. If the number of bytes segment does not match the number of bytes denoted by the integrity check parameter, the universal remote control unit 54 preferably indicates an error condition by illuminating the error indicator 79 on the unit.

This "check-sum" type of integrity check parameter is an advantageously simple way of confirming the integrity of the data transmission. The unidirectional transmitter and receiver system 10 may also conduct other more sophisticated integrity checking operations, such as those using "cyclic redundancy check" (CRC) parameters, which are well known to those skilled in the art. Generally described, the computer system 12 performs a running calculation on the transmitted data and includes the result of this calculation in the CRC, which is transmitted to the universal remote control unit 54. The CRC corresponds to a data segment transmitted to the universal remote control unit 54, which repeats the calculation on the received data segment. If the computed CRC matches the received CRC, the universal remote control unit 54 confirms the integrity of the received data segment. It will be appreciated that CRCs of this type may be included at any point in a transmitted data stream, and may be more that one byte in length.

The integrity check parameter may also, or in the alternative, include a packet number that indicates the number of the packet containing the integrity check parameter in a sequence of data packets defining a data segment. In an embodiment, the sequence of packets is defined by a sequence of screen displays on the CRT screen of the monitor 36. In this embodiment, the packet number typically correspond to the number of the screen display containing the integrity check parameter within the sequence of screen display on the CRT. For example, a data segment may be defined by a sequence of screen displays on the CRT screen of the monitor 36. The packet number indicated by the integrity check parameter may be set to one for the first screen display of the data segment, two for the second screen display of the data segment, and so on.

In view of the foregoing, it will be appreciated that the disclosed embodiment provides a method and system for automatically synchronizing the baud rate of the receiver, the universal remote control unit 54, with the baud rate of the monitor 36, which is controlled by the computer system 12 to operate as a one-bit-per-scan-line unidirectional transmitter. The universal remote control unit 54 provides a lock indication upon synchronizing its baud rate with that of the monitor 36. The disclosed embodiment also provides a method for verifying the integrity of data received by the universal remote control unit 54. If the integrity of the data is not confirmed, the universal remote control unit 54 provides an error indication. The universal remote control unit 54 thus provides the user with feedback during the process of configuring of the unit. Specific algorithms for programming the computer system 12 and the universal remote control unit 54 to perform these operations are described below.

Logic Flow Diagrams Illustrating The Operation of the Disclosed Embodiment

Figure 4:
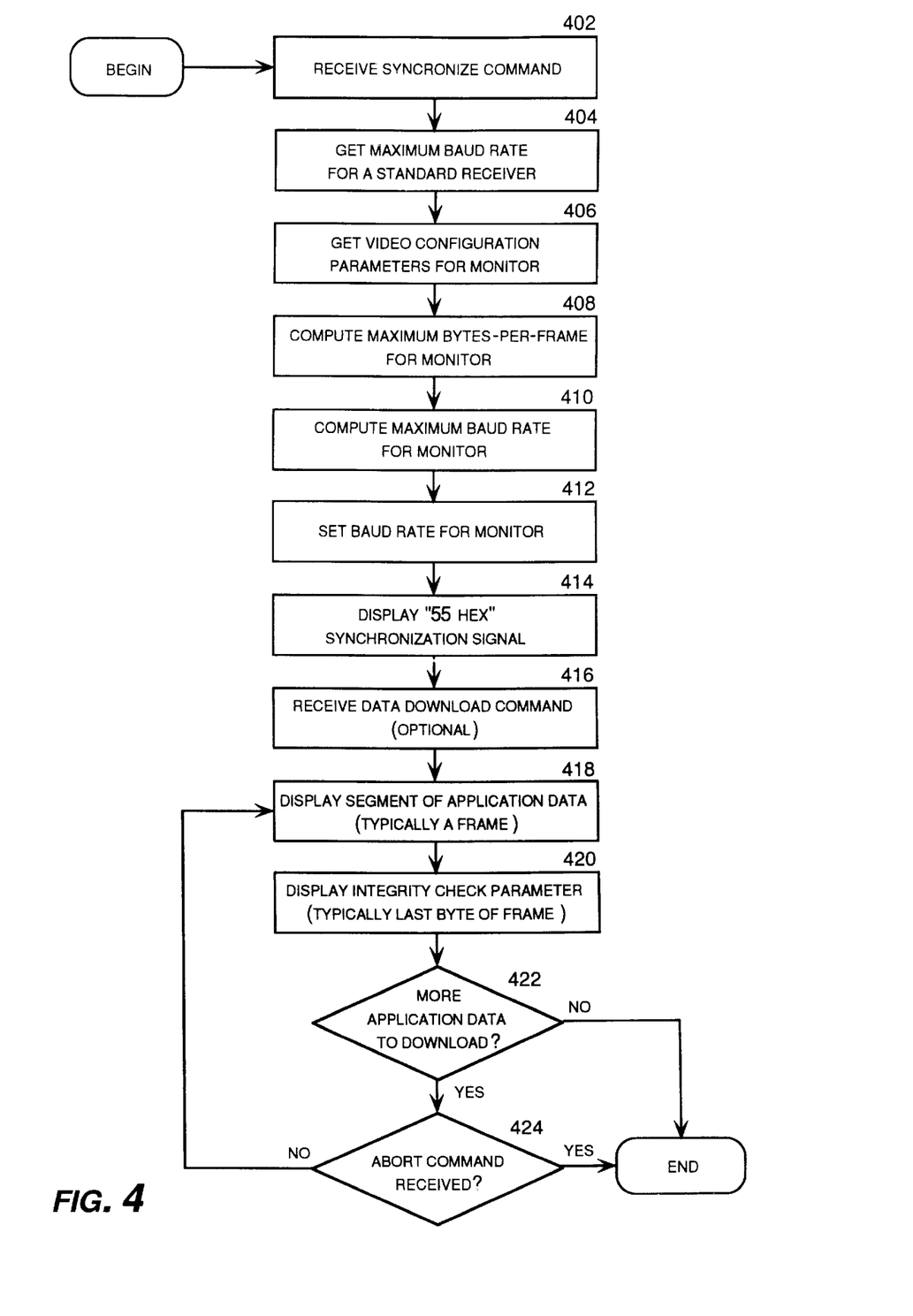
FIG. 4 is a logic flow diagram illustrating a computer-implemented process for operating a CRT as a unidirectional transmitter in accordance with a disclosed embodiment of the present invention.

FIG. 4 is a logic flow diagram illustrating a computer-implemented process for operating the monitor 36 as a unidirectional transmitter. It should be appreciated that the synchronization process described above is complicated by the fact that the maximum baud rate of a given monitor operated as a transmitter may be greater than the maximum baud rate of a given receiver. Therefore, the maximum baud rate for a known receiver, preferably a typical receiver designed for configuration by the computer system 12, is coded into the auto-sync program module 50. The auto-sync program module 50 ensures that the baud rate selected for the monitor 36 does not exceed the maximum baud rate of the known receiver, as described below.

Referring to FIGS. 1, 3, and 4, in step 402, the auto-sync program module 50 receives a synchronization command from the user input/output system 28. The auto-sync program module 50 then gets the maximum baud rate for a known receiver in step 404, and the video configuration parameters for the monitor 36 in step 406. These video configuration parameters typically include the number of scan lines per frame, and the vertical refresh rate, for the monitor 36. The maximum bytes-per-frame and the maximum baud rate for the monitor 36 are computed in steps 408 and 410, respectively.

Specifically, the maximum RS-232 formatted bytes-per-frame for the monitor 36 is derived in step 408 as the greatest integer that is less than or equal to the number of scan lines per frame for the monitor 36, divided by 10. The maximum baud rate for the monitor 36 is computed in step 410 as the maximum bytes-per-frame for the monitor 36, times 10, times the vertical refresh rate for the monitor 36. For a typical monitor with 480 scan lines per frame and a vertical refresh rate of 60 Hertz, for example, the monitor 36 can transmit 48 bytes-per-frame (greatest integer that is less than or equal to 480/10) resulting in a baud rate of 28,800 (48×10×60).

In step 412, a baud rate is selected for the monitor 36. Specifically, the baud rate for the monitor 36 is selected to be equal to the lesser of the maximum baud rate for the known receiver and the maximum baud rate for the monitor 36. In step 414, the "55 hex" transmitter synchronization signal 70 is transmitted by the monitor 36 at the baud rate selected for the monitor 36. Typically, at least four bytes of the synchronization signal are transmitted to allow the universal remote control unit 54 to lock to the proper baud rate.

Application data 90 may be transmitted immediately following a relatively short transmitter synchronization signal 70, such as a single frame or a portion of a frame. Optionally, the monitor 36 may display the transmitter synchronization signal 70 until the auto-sync program module 50 receives a data download command from the user input/output system 28 in step 416. It should be appreciated that a user of the disclosed embodiment preferably inputs this data download command in response to illumination of the lock indicator 78 on the universal remote control unit 54.

In step 418, a segment of application data 90, typically a frame, is displayed on the monitor 36. Step 418 is followed by step 420, in which an integrity check parameter 92 is displayed on the monitor 36, typically as the last byte of the frame. In decision step 422, it is determined whether there is more application data 90 to download. If there is more application data 90 to download, the "YES" branch is followed from step 422 to decision step 424, in which it is determined whether an abort command has been received from the user input/output system 28. If an abort command has not been received from the user input/output system 28, the "NO" branch loops from step 424 to step 418, in which another segment of application data 90 is displayed on the monitor 36.

Referring again to decision step 422, if there is no more application data 90 to download, the "NO" branch is followed from step 422 to the "END" step, and the computer-implemented process illustrated by FIG. 4 is completed. Similarly, if an abort command has been received from the user input/output system 28 in decision step 424, the "YES" branch is followed from step 422 to the "END" step, and the computer-implemented process illustrated by FIG. 4 is completed. It should be appreciated that a user of the disclosed embodiment preferably inputs this abort command in response to illumination of the error indicator 79 on the universal remote control unit 54. The computer-implemented process illustrated by FIG. 4 thus loops through steps 418 through 424 until all the application data 90 has been downloaded, or until an abort command has been received from the user input/output system 28.

Figure 5:
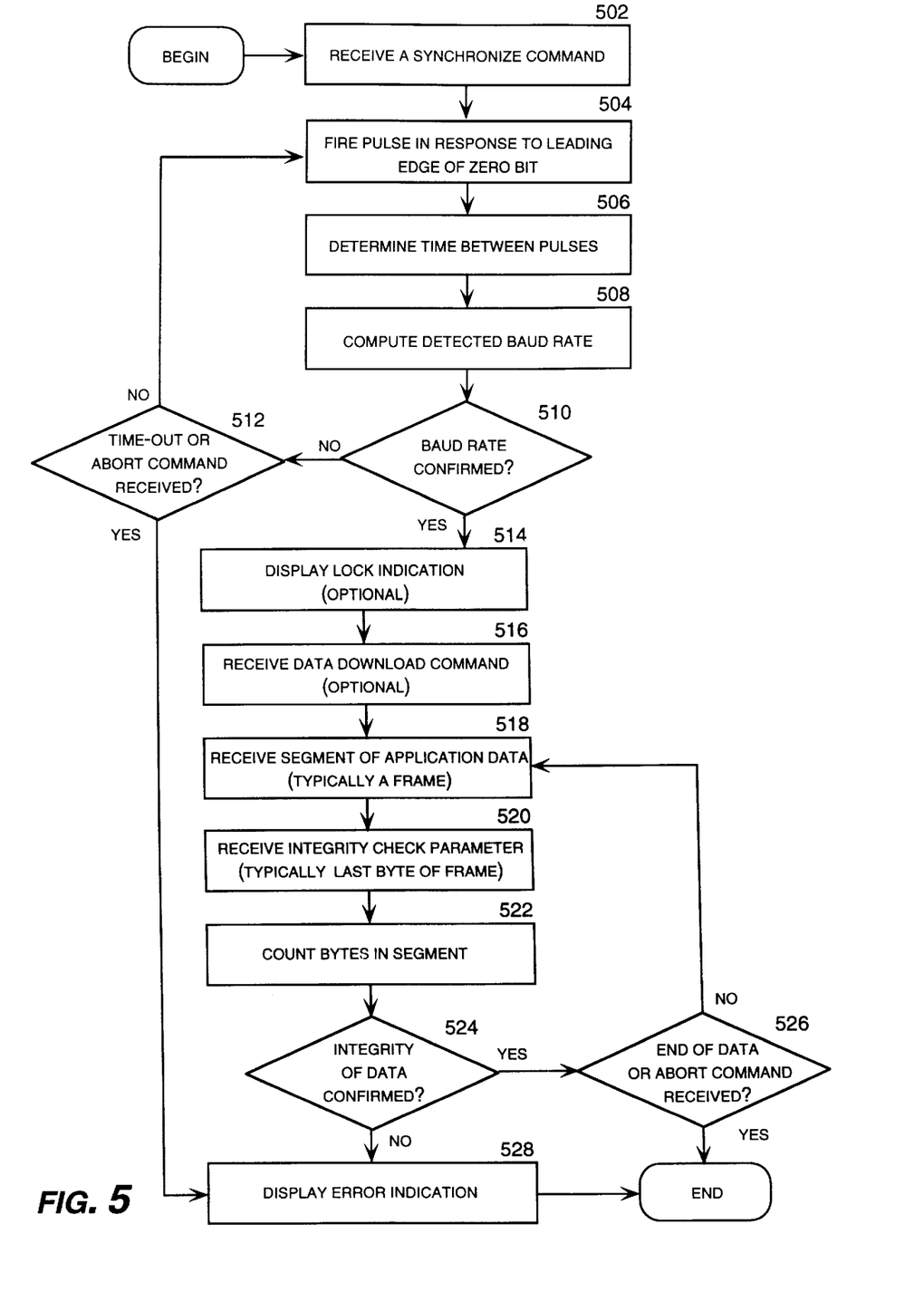
FIG. 5 is a logic flow diagram illustrating a computer-implemented process for operating a receiver for a unidirectional transmitter in accordance with a disclosed embodiment of the present invention.

FIG. 5 is a logic flow diagram illustrating a computer-implemented process for operating a receiver for a unidirectional transmitter, such as the universal remote control unit 54. The universal remote control unit 54 includes a processing unit 76 that is configured to implement the process illustrated by FIG. 5. For example, this processing unit 76 may include any of a variety of commercially available programmable microprocessor or microcontroller unit. Alternatively, the processing unit 76 include an application specific integrated circuit (ASIC) or other type of programmable controller, as is well known to those skilled in the art.

Referring to FIGS. 1, 3, and 5, in step 502, the universal remote control unit 54 receives a synchronize command. A user typically inputs this synchronize command by depressing a predefined button on the universal remote control unit 54. In step 504, the photo-detector 75 of the universal remote control unit 54 fires an electronic pulse in response to the leading edge of a zero bit of the transmitter synchronization signal 70 displayed on the monitor 36. In step 506, the universal remote control unit 54 measures the synchronization parameter 88, which is the time "t" between consecutive electronic pulses, represented by the electronic pulses 84a and 84b. In step 508, the baud rate of the monitor 36 is computed as "2/t."

Step 508 is followed by decision step 510, in which it is determined whether the detected baud rate has been confirmed. Typically, confirmation requires about four consecutive measurements of the synchronization parameter 88 that produce the same detected baud rate. If the detected baud rate has not been confirmed, the "NO" branch is followed from step 510 to decision step 512, in which it is determined whether a time-out duration has been exceeded, or whether an abort command has been received.

The abort command allows the user to manually terminate the configuration process at any time. A user preferably inputs an abort command by depressing a predefined button on the universal remote control unit 54. The user may then also abort the operation of the computer system 12 (step 424). In addition, the universal remote control unit 54 automatically terminates the configuration process if it is not completed within the time-out duration. The time-out duration is preferably set to about three or four seconds. If the time-out duration has been exceeded, the user is preferably instructed to reposition the universal remote control unit 54, typically through an instruction displayed on an electronic or liquid-crystal display (LCD) included on the unit. Alternatively, appropriate instructions may be included in a printed or computer-readable instruction manual that is provided with the universal remote control unit 54.

If a time-out or abort condition has not occurred, the "NO" branch loops from step 512 to step 504, in which the photo-detector 75 of the universal remote control unit 54 fires another electronic pulse in response to the leading edge of a zero bit of the transmitter synchronization signal 70 displayed on the monitor 36. If a time-out or abort condition has occurred, the "YES" branch is followed from step 512 to step 528, in which the error indicator 79 on the universal remote control unit 54 is illuminated. Step 528 is followed by the "END" step, and the computer-implemented process illustrated by FIG. 5 is completed. It will therefore be appreciated that the computer-implemented process illustrated by FIG. 5 loops through steps 504 through 512 until the detected baud rate is confirmed, or until a time-out or abort condition occurs.

Referring again to step 510, if the detected baud rate is confirmed, the "YES" branch is followed from step 510 to step 514, in which the lock indicator 78 is illuminated. Optionally, the universal remote control unit 54 waits for a data download command prior to beginning to interpret light pulses as application data 90. A user typically inputs this data download command by depressing a predefined button on the universal remote control unit 54. Alternatively, this data download command may be input at the user input/output system 28 of the computer system 12 (step 416), provided that the universal remote control unit 54 was previously enabled to wait for the beginning of a data transmission.

Step 516 is followed by step 518, in which the universal remote control unit 54 receives a data segment (typically a frame) of application data 90, which the universal remote control unit 54 stores in the memory device 77. In step 520, the universal remote control unit 54 receives an integrity check parameter 92 (typically the last byte of the frame) that denotes the number of bytes in the transmitted data segment. In step 522, the universal remote control unit 54 counts the bytes in the received data segment. In decision step 524, the universal remote control unit 54 confirms the integrity of the data segment, typically by comparing the number of bytes in the received data segment to the number of bytes denoted by the integrity check parameter 92.

If the integrity of the segment is confirmed, the "YES" branch is followed from step 524 to step 526, in which it is determined whether an end-of-data or abort condition has occurred. If an end-of-data or abort condition has not occurred, the "NO" branch loops to step 518, in which the universal remote control unit 54 receives another segment of application data 90. If an end-of-data or abort condition has occurred, the "YES" branch is followed from step 526 to the "END" step, and the computer-implemented process illustrated by FIG. 5 is completed.

Referring again to step 524, if the integrity of the data segment is not confirmed, the "NO" branch is followed from step 524 to step 528, in which the error indicator 79 on the universal remote control unit 54 is illuminated. Step 528 is followed by the "END" step, and the computer-implemented process illustrated by FIG. 5 is completed. It will therefore be appreciated that the computer-implemented process illustrated by FIG. 5 loops through steps 518 through 528 until all of the application data 90 has been downloaded, or until the integrity of a data segment has not been confirmed, or until an abort command has been received.

In view of the foregoing, it will be appreciated that the present invention provides an improved method and system for configuring a universal remote control unit. More specifically, the present invention provides a method and system for configuring a universal remote control unit using a CRT controlled by a personal computer system. In so doing, the present invention provides an improved method and system for using a CRT as a unidirectional transmitter. The resulting system therefore has the advantages of requiring only inexpensive alterations to a conventional system is easy to implore unit. Moreover, the system is easy to implement using a conventional personal computer, and is effective at downloading a sufficient amount of data in a sufficiently short period of time.

It should be understood that the foregoing relates only to the disclosed embodiment of the present invention, and that numerous changes may be made therein without departing from the spirit and scope of the invention as defined by the following claims.

We claim:

1. A method for communicating data between a display device operating as a unidirectional transmitter and a receiver, comprising the steps of:
   at the display device,
      displaying a plurality of scanline at a selected baud rate for the transmitter, the scan lines defining a synchronization signal for receipt by the receiver; and
   at the receiver,
      receiving the synchronization signal,
      measuring a synchronization parameter from the synchronization signal by determining a time differential between a first scan line and a second scan line of the synchronization signal, and
      selecting a baud rate for the receiver based on the synchronization parameter.

2. The method of claim 1, further comprising the steps of:
   transmitting a data segment from the transmitter at the selected baud rate for the transmitter;
   receiving the data segment at the receiver at the selected baud rate for the receiver; and
   storing the data segment in a memory storage device of the receiver.

3. The method of claim 2, further comprising the steps of:
   transmitting an integrity check parameter from the transmitter at the selected baud rate for the transmitter;
   receiving the integrity check parameter at the receiver at the selected baud rate for the receiver;
   based on the integrity check parameter, determining whether the data segment was properly received; and
   if the data segment was not properly received, indicating an error condition at the receiver.

4. The method of claim 3, wherein:
   the integrity check parameter denotes an amount of data comprising the data segment; and
   the step of determining whether the data segment was properly received comprises the steps of:
      determining an amount of data comprising the data segment at the receiver, and
      comparing the amount of data comprising the data segment to the amount of data denoted by the integrity check parameter.

5. The method of claim 1, wherein:
   the transmitter comprises a CRT for displaying information; and
   the receiver comprises a photo-detector that is responsive to the information displayed on the CRT.

6. The method of claim 5, wherein:
   the synchronization signal comprises a plurality of bits;
   the CRT is operative to display a plurality of consecutive horizontal scan lines; and
   each of a plurality of the consecutive horizontal scan lines comprises a bit of the synchronization signal.

7. The method of claim 6, wherein
   the synchronization signal comprises alternating illuminated and non-illuminated horizontal scan lines displayed on the CRT; and
   the synchronization parameter comprises the time between the display of two consecutive illuminated horizontal scan lines on the CRT.

8. The method of claim 2, wherein:
   the receiver comprises a universal remote control unit for controlling an appliance; and
   the data segment comprises application data for configuring the universal remote control unit to interact with the appliance.

9. The method of claim 8, wherein:
   the transmitter comprises a CRT that is operative to display a plurality of consecutive horizontal scan lines;
   each of a plurality of the consecutive horizontal scan lines comprises a bit of the transmitted data segment; and
   the receiver comprises a photo-detector that is responsive to the information displayed on the CRT.

10. A display device operation as a unidirectional transmitter for transmitting data to a receiver, comprising:
    means for determining a maximum baud rate for the display device;
    means for selecting a baud rate for the display device equal to about the lesser of the maximum baud rate for a known receiver and the maximum baud rate for the display device; and
    means for displaying a synchronization signal at the selected baud rate for the display device, the synchronization signal comprising a synchronization parameter for receipt by a receiver configured to measure baud rate for the display device based on the synchronization parameter by determining a time differential between a first scan line and a second scan line of the synchronization signal and to set the baud rate of the receiver to match the baud rate of the display device.

11. The unidirectional transmitter of claim 10, further comprising means for transmitting a data segment at the selected baud rate for the transmitter.

12. The unidirectional transmitter of claim 11, further comprising means for transmitting an integrity check parameter for verifying the integrity of the data segment at a receiver.

13. The unidirectional transmitter of claim 12, wherein
the transmitter comprises a CRT that is operative to display a plurality of consecutive horizontal scan lines;
the synchronization signal comprises alternating illuminated and non-illuminated horizontal scan lines displayed on the CRT;
the synchronization parameter comprises the time between the display of two consecutive illuminated horizontal scan lines on the CRT; and
the integrity check parameter denotes an amount of data comprising the data segment.

14. A receiver for receiving data from a display device operating as a unidirectional transmitter, comprising:
means for receiving a synchronization signal from the display device;
means for measuring a synchronization parameter from the synchronization signal by determining a time differential between a first scan line and a second scan line of the synchronization signal; and
means for selecting a baud rate for the receiver based on the synchronization parameter.

15. The receiver of claim 14, further comprising means for indicating a lock condition upon selecting the baud rate for the receiver, the lock condition signifying that the baud rate has been selected for the receiver.

16. The receiver of claim 15, further comprising means for indicating an error condition if the baud rate for the receiver cannot be selected based on the synchronization parameter.

17. The receiver of claim 16, wherein
the synchronization signal comprises alternating illuminated and non-illuminated horizontal scan lines displayed on a CRT; and
the synchronization parameter comprises the time between the display of two consecutive illuminated horizontal scan lines on the CRT.

18. A computer-readable medium storing a program module comprising instructions which, when executed by a computer system comprising a processing unit, a memory storage device, and a user input/output system including a CRT, cause the computer system to perform the steps of:
retrieving configuration parameters associated with the CRT from the memory storage device;
computing the maximum baud rate at which the CRT may be operated as a unidirectional transmitter;
selecting a baud rate for the CRT equal to about the lesser of the maximum baud rate for a known receiver and the maximum baud rate at which the CRT may be operated as a unidirectional transmitter; and
displaying a synchronization signal on the CRT at the selected baud rate for operating the CRT, the synchronization signal comprising a synchronization parameter for receipt by a receiver configured to measure baud rate for the CRT based on the synchronization parameter by determining a time differential between a first scan line and a second scan line of the synchronization signal and to set the baud rate of the receiver to match the baud rate of the CRT.

19. The computer-readable medium of claim 18, wherein:
the configuration parameters comprise the number of scan lines per frame, and the vertical refresh rate, of the CRT; and
the synchronization signal comprises alternating illuminated and non-illuminated horizontal scan lines displayed on the CRT.

20. A computer-readable medium storing a program module comprising instructions which, when executed by a receiver comprising a processing unit, cause the receiver to perform the steps of:
receiving a synchronization signal comprising alternating illuminated and non-illuminated horizontal scan lines on a CRT;
measuring a synchronization parameter comprising the time between the display of two consecutive illuminated horizontal scan lines on the CRT;
selecting a baud rate for the receiver based on the synchronization parameter; and
indicating a lock condition upon selecting the baud rate for the receiver.

21. In a receiver comprising a processing unit, a memory storage device, and a photo-detector, a method for receiving data displayed on a CRT, comprising the steps of:
receiving a synchronization signal displayed on the CRT via the photo-detector, the synchronization signal comprising a plurality of bits wherein each bit comprises a line displayed on the CRT;
measuring a synchronization parameter from the synchronization signal;
selecting a baud rate for the receiver based on the synchronization parameter;
indicating a lock condition upon selecting the baud rate for the receiver;
receiving a data segment displayed on the CRT, the data segment comprising a plurality of bits wherein each bit comprises a line displayed on the CRT;
receiving an integrity check parameter displayed on the CRT, the integrity check parameter comprising a plurality of bits wherein each bit comprises a line displayed on the CRT;
determining whether the data segment was properly received based on the integrity check parameter; and
if the data segment was not properly received, indicating an error condition.

22. In a computer system comprising a processing unit, a memory storage device, and a user input/output system including a CRT, a method for transmitting data from the CRT, comprising the steps of:
retrieving the number of scan lines per frame, and the vertical refresh rate, of the CRT from the memory storage device;
computing the maximum baud rate at which the CRT may be operated as a unidirectional transmitter;
selecting a baud rate for the CRT equal to about the lesser of the maximum baud rate for a known receiver and the maximum baud rate at which the CRT may be operated as a unidirectional transmitter;
displaying a synchronization signal on the CRT at the selected baud rate for the CRT, the synchronization signal comprising a plurality of bits wherein each of a plurality of the consecutive horizontal scan lines displayed on the CRT comprises a bit of the synchronization signal, the synchronization signal comprising a synchronization parameter for receipt by a receiver configured to measure baud rate for the CRT based on the synchronization parameter and to set the baud rate of the receiver to match the baud rate of the CRT;
displaying a data segment on the CRT, the data segment comprising a plurality of bits wherein each of a plurality of the consecutive horizontal scan lines displayed on the CRT comprises a bit of the data segment; and displaying an integrity check parameter on the CRT denoting an amount of data comprising the data segment, the integrity check parameter comprising a plurality of bits wherein each of a plurality of the consecutive horizontal scan lines displayed on the CRT comprises a bit of the integrity check parameter.

23. The method of claim 22, wherein the data segment comprises application data for configuring a universal remote control unit to interact with a remotely controlled appliance.

24. The method of claim 4, wherein the data segment comprises a sequence of packets, and wherein the integrity check parameter includes a data element that indicates a packet number that corresponds to the number of the packet containing the integrity check parameter in the sequence of packets.

25. The method of claim 7, wherein:

the data segment comprises a sequence of packets;

the integrity check parameter includes a data element that indicates a packet number that corresponds to the number of the packet containing the integrity check parameter in the sequence of packets;

the sequence of packets is defined by a sequence of screen displays on the CRT; and the packet number corresponds to the number of the screen display containing the integrity check parameter within the sequence of screen display on the CRT.

* * * * *